United States Patent [19]
Okamoto et al.

[11] Patent Number: 5,101,423
[45] Date of Patent: Mar. 31, 1992

[54] X-RAY CASSETTE

[75] Inventors: Tadaomi Okamoto, Kanagawa; Masayuki Ohta, Saitama, both of Japan

[73] Assignee: Kabushiki Kaisha Okamoto Seisakusho, Tokyo, Japan

[21] Appl. No.: 598,645

[22] PCT Filed: Feb. 15, 1990

[86] PCT No.: PCT/JP90/00181
  § 371 Date: Oct. 12, 1990
  § 102(e) Date: Oct. 12, 1990

[87] PCT Pub. No.: WO90/09620
  PCT Pub. Date: Aug. 23, 1990

[30] Foreign Application Priority Data
  Feb. 15, 1989 [JP] Japan .................. 1-16653[U]

[51] Int. Cl.⁵ .................................. G03B 42/04
[52] U.S. Cl. .............................. 378/182; 378/187; 378/188
[58] Field of Search .............. 403/403, 295, 205; 378/182, 183, 184, 185, 186, 187, 188

[56] References Cited
U.S. PATENT DOCUMENTS
3,157,787 11/1964 Kendziorski, Jr. et al. ........ 378/188

FOREIGN PATENT DOCUMENTS
3815945 11/1989 Fed. Rep. of Germany ...... 403/403
55-50672 11/1980 Japan .
58-33540 7/1983 Japan .
0361152 11/1931 United Kingdom ............... 378/182

Primary Examiner—Janice A. Howell
Assistant Examiner—David P. Porta
Attorney, Agent, or Firm—Armstrong, Nikaido, Marmelstein, Kubovcik & Murray

[57] ABSTRACT

An X-ray cassette for retaining an X-ray sheet film or the like. The frame (13) of the X-ray cassette comprises corner members (20) corresponding to corner portions of a front plate and straight members (30), connected to the corner members and corresponding to side portions of the front plate. The corner members (20) each have a nearly L-shaped body (21), fitting projections (22) protruding from both ends of the body (21) and fitting pins (23) formed integrally. The straight members (30) have each fitting recesses (31, 32) to receive the fitting projections (22) and fitting pins (23) of the corner member (20), with front-plate receiving grooves (24, 33) formed continuous in the inner walls of the corner members (20) and straight members (30) for receiving edge portions of the front plate (12). Accordingly, it is possible to reduce the manufacturing cost of the X-ray cassette and improve the strength thereof.

8 Claims, 6 Drawing Sheets

X-RAY CASSETTE

TECHNICAL FIELD

The present invention relates to an X-ray cassette for retaining a sheet film for X-ray usage or the like.

BACKGROUND ART

X-ray cassettes are disclosed in, for example, Published Examined Japanese Utility Model Application No. 55-50672 and Published Examined Japanese Patent Application No. 58-33540 (German Utility Model Application No. 812806). The former X-ray cassette has a metal frame provided around a front plate. The latter X-ray cassette has its front plate and frame made integrally of plastic, and has flexible members attached to the corner portions of the frame to absorb shocks caused by falling or the like, thereby preventing the X-ray cassette from being damaged.

The frame of the former X-ray cassette is formed by cutting an elongated metal member, such as an aluminum extruded member or roll-molded member, to the proper length, bending the cut member to match the shape of the front plate, and joining its but-joint ends together by means of welding or the like. Although the X-ray cassette is excellent in term of the durability, shock resistance, etc. due the frame being made of metal makes the manufacturing thereof troublesome. In other words, the cross-sectional shape of the frame should be determined in consideration of the bending formation, which limits the improvement thereof in terms of strength. Further, deformation or twisting may occur at the time of bending the metal member. Furthermore, there may be a slight error in the bent positions of the frame; particularly, insufficient strength, the occurrence of deformation, twisting or the like, and an error in the bent positions should be considered for a large cassette for retaining a broader film.

Since the latter X-ray cassette is made of plastic, it is easy to produce and is excellent in terms of obtaining accuracy in sizes. Because of the plastic-formed, however, the X-ray cassette has low durability and low shock resistance, making it easy to cause deformation with the passage of time.

It is therefore an object of the present invention to provide an X-ray cassette which has an improved strength, is free of deformation, twisting or the like, is easy to manufacture, and can improve the size accuracy.

Disclosure of the Invention

In order to achieve the above object, the X-ray cassette of the present invention, which has a substantially rectangular front plate, a frame providing around the front plate and a back plate hinged to the frame. The frame comprises corner members corresponling to corner
of the front plate and straight members, connected to the corner members and corresponding to side portions of the front plate. Each of the corner members has a substantially L-shaped body, fitting projections protruding from both ends of the body and fitting pins formed integrally. Each of the straight members has fitting recesses to receive the fitting projections and fitting pins of the corner member with front-plate receiving grooves formed continuous in inner walls of the corner members and the straight members for receiving edge portions of the front plate.

In forming the frame by the above combination of structural the corner members and the straight members can eliminate a step of bending the frame, and can permit the use of members with a cross-sectional shape having an excellent strength to deform or twist without consideration of bending formation. In addition, it is possible to reduce the occurrence of deformation or the like with the passage of time.

BRIEF DESCRIPTION OF THE DRAWINGS

FIG. 1 is an exploded perspective view of a frame;

FIG. 2 is a general perspective view of the X-ray cassette with its back plate open;

FIG. 3 is a general perspective view of the X-ray cassette with its back plate closed;

FIG. 4 is a cross section taken along the line 4—4 in FIG. 3;

FIG. 5 is a front view of essential portions;

FIG. 6 is a cross section taken along the line 6—6 in FIG. 5;

FIG. 7 is a cross section taken along the line 7—7 in FIG. 5;

FIG. 8 is an exploded perspective view of essential portions of a frame; and

FIG. 9 is a cross section taken along the line 9—9 in FIG. 8.

DETAILED DESCRIPTION OF THE PREFERRED EMBODIMENTS

One preferred embodiment of the present invention will now be described referring to FIGS. 1 through 7.

An X-ray cassette 11 of the present invention comprises a rectangular front plate 12, a frame 13 openable and closable back plate 14 hinged at one side of the frame 13.

Figure 1:
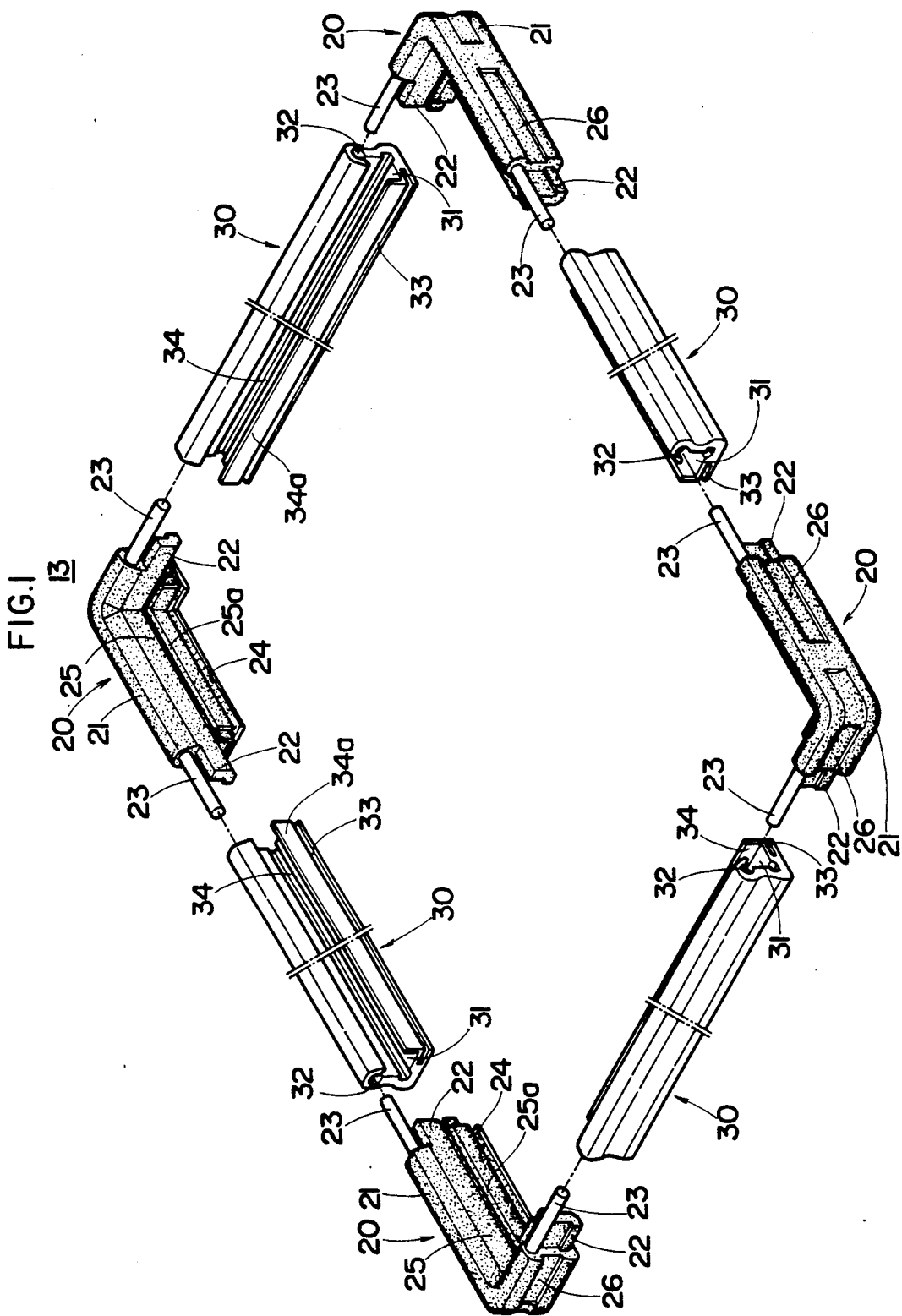
FIGS. 1 through 7 illustrate one embodiment of an X-ray cassette of the present invention.
Figure 2:
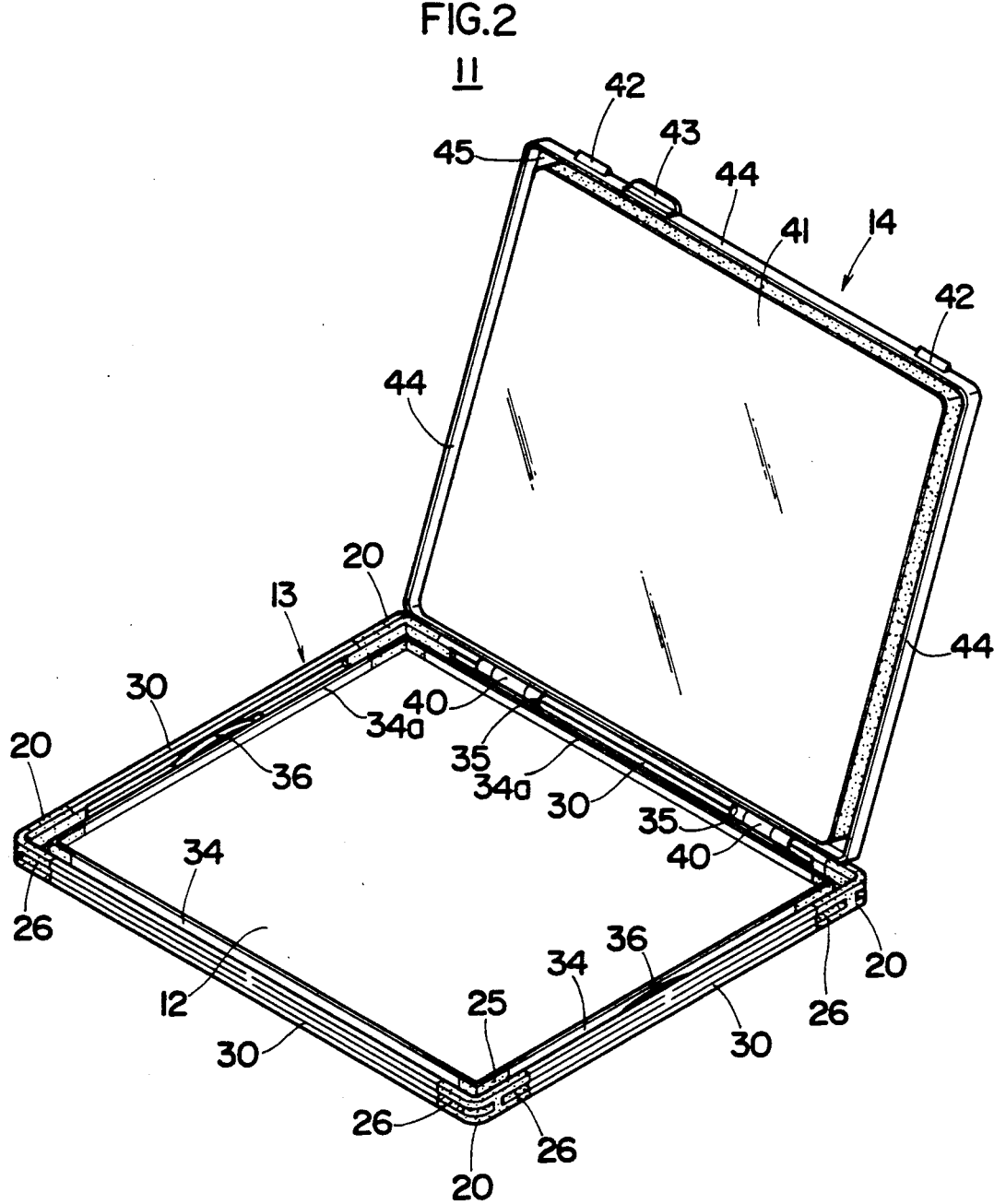
Figure 3:
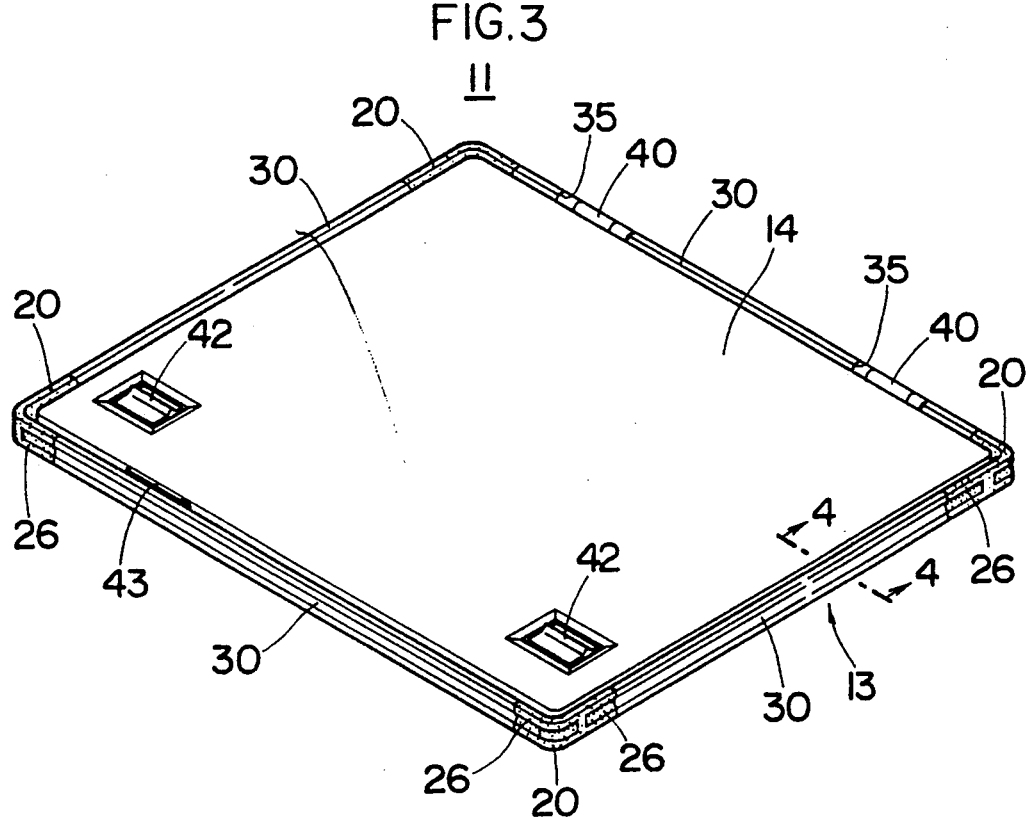
Figure 4:
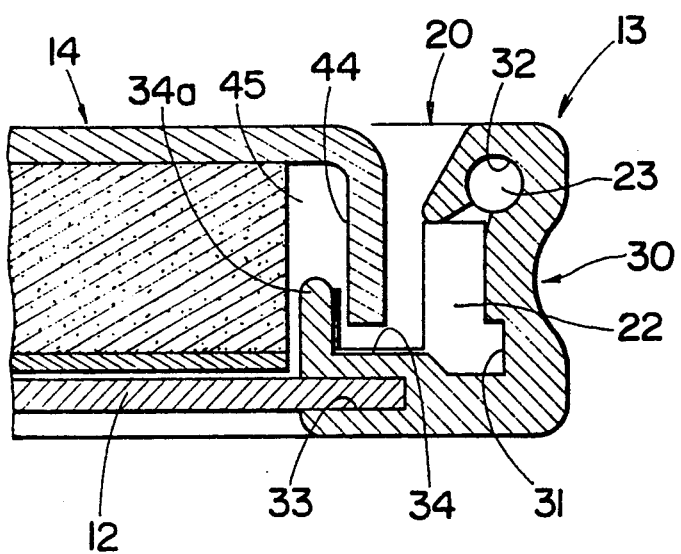
Figure 5:
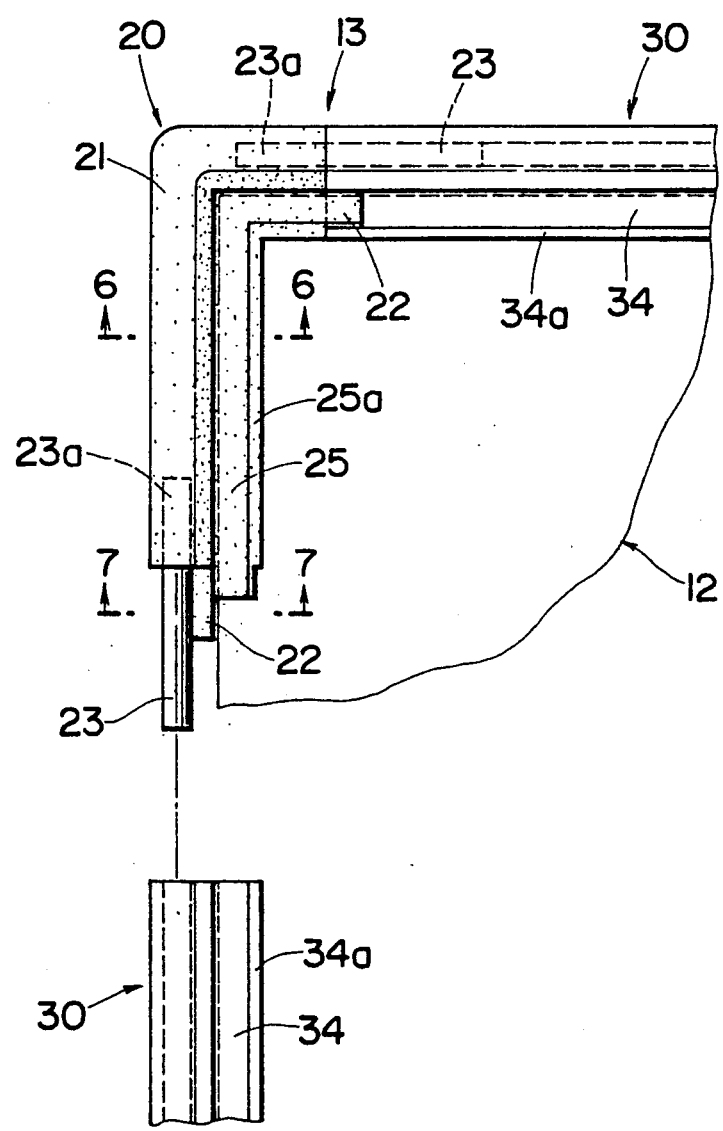
Figure 6:
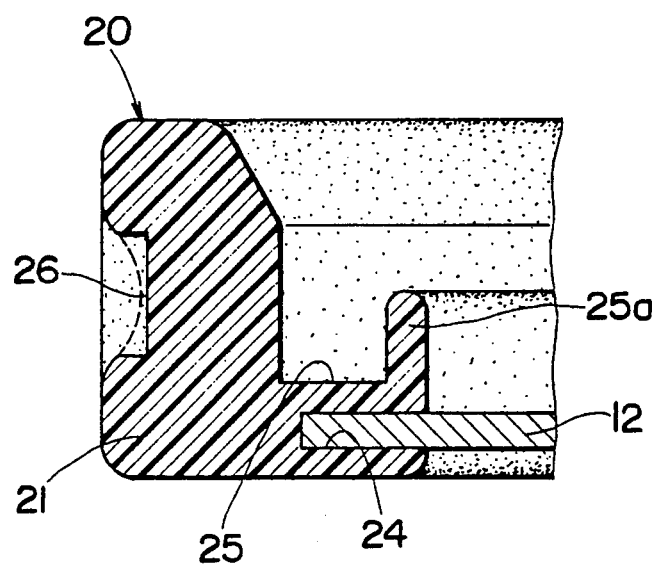
Figure 7:
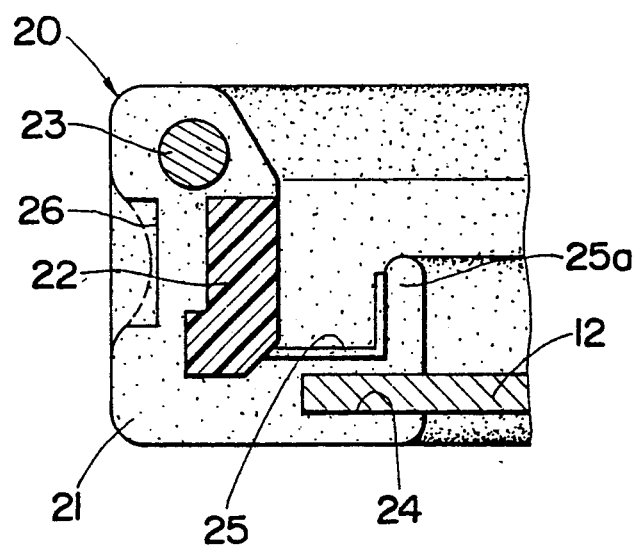

As shown in FIG. 1, the frame 13 is formed by connecting four corner members 20, corresponding to the respective corners of the front plate 12, to four straight members 30 corresponding to the respective sides of the front plate 12.

Each of the corner members 20 includes a nearly L-shaped body 21, fitting projections 22 and fitting pins 23 with a circular cross section protruding from both ends of the body 21. The body 21 and the projections 22 are integrally formed of hard synthetic resin. The fitting pins 23, each comprising a bar of metal such as stainless steel, are also made integral with the body 21. One end 23a of each bar is buried into the synthetic resin during the process of forming the body 21. In the inner wall of the body 21 are provided a front-plate receiving groove 24 to receive the edges of the front plate 12, and a recessed groove 25 which is open on the back plate side. On the outer wall of the body 21 are formed indicator-attaching recesses 26 which are to be colored for various displays or to be attached with indicators. The coloring of the recess 26, or the attaching of an indicator prevents the indication from peeling or coming off during usage.

The straight members 30 are formed with an aluminum member, and are cut to a predetermined lengths. In the inner wall of every straight member 30 are formed recesses 31 and 32 to receive the projections 22 and the fitting pins 23 of the corner member 20, and a front-plate receiving groove 33 and a recess 34, the latter two communicating with the front-plate receiving groove 24 and the groove 25 of the corner member 20. According to this embodiment, one groove of the straight member 30 serves both as the recess 31 to receive the projection 22 of the corner member 20 and as the recess 34.

The corner member 20 and the straight member 30 are assembled by fitting the projections 22 and the fitting pins 23 of the corner members 20 into the recesses 31 and 32 of the straight members 30, while fitting the edges of the front plate 12 into the front-plate receiving grooves 24 and 33. The projections 22 of the corner members 20 seal gaps at the joined sections, aiming at light-tightness of the X-ray cassette 11 as well as provide baffling for the corner members 20 and the straight members 30. Further, the metal-made fitting pins 23 can enhance the assembly strength at the join sections between the corner members 20 and the straight members 30. An adhesive is used in assembling the frame 13 as needed.

A hinge section 35 for the back plate 14 is formed by forming a cutaway in one of the straight members 30 of the frame 13, and a hinge 40 of the back plate 14 is attached to the hinge section 35. In the groove 34 of the straight member 30, a spring 36 for urging the back plate 14 in the opening direction, a cushion member, such as sponge or rubber, and a seal member (not shown) are provided as needed.

Although the front plate 12 can be made of a material which has conventionally been used for this type of cassette, it may be made of a material having an excellent performance, such as strength, in comparison to the aforementioned cassette which is integrally formed of plastic.

The back plate 14 has a film pressing member 41 stuck in the inner wall to adhere an X-ray film (not shown) to the inner wall of the front plate 12 with pressure with the hinge 40 attached to one side edge and a lock device 42 and a lift 43 provided on the opening side. This back plate 14 has a projection 44 formed at the periphery which is to be fitted in the grooves 25 and 34 formed in the corner members 20 and straight members 30.

This projection 44 is formed by bending the periphery of the back plate 14, and between the projection 44 and the film pressing member 41 is formed a gap 45 in which are fitted. The rising sides 25a and 34a of the grooves 25 and 34, and the projection 44 are fitted with a slight gap therebetween in the gap 45 or the grooves 25 and 34.

Forming the closing portions of the periphery of the back plate 14 and the frame 13 in the above manner can improve the light-tightness of the X-ray cassette 11. Since both are closed with a slight gap therebetween, even a slight deformation in each member does not hinder the opening and closing of the back plate 14, nor does it impair the light-tightness.

The thus constituted X-ray cassette 11 has a significantly improved strength and shock resistance as compared to the conventional cassette integrally formed of plastic, and can sufficiently endure a long life. In addition, because the frame 13 is assembled with the corner members 20 and straight members 30, this cassette is easier to manufacture and has no deformation or bending occurring at the manufacturing time when compared to the conventional type having a metal frame.

Further, since the straight members 30 can be provided by simply cutting a long member extruded in a predetermined shape, the size accuracy can be improved. In addition, the corner members 20 can be integrally formed of hard synthetic resin; thereby providing sufficient size accuracy and strength. Furthermore, as these members can be easily assembled, it is possible to contribute in the redirection of the manufacturing cost of the X-ray cassette 11 and the improvement of the quality thereof.

Figure 8:
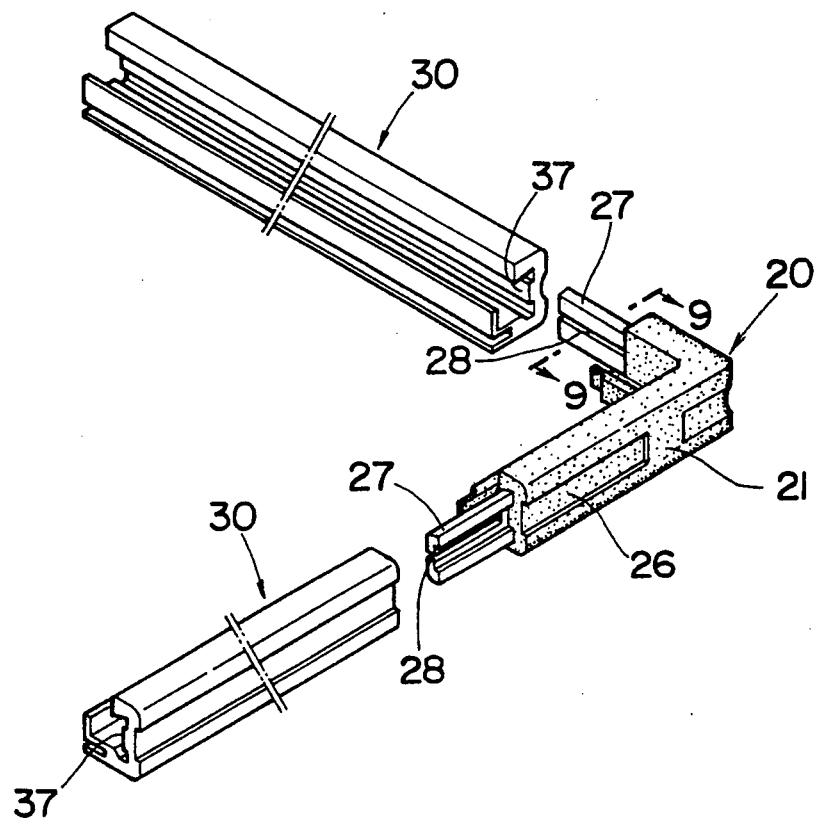
FIGS. 8 and 9 illustrate another embodiment of the present invention.
Figure 9:
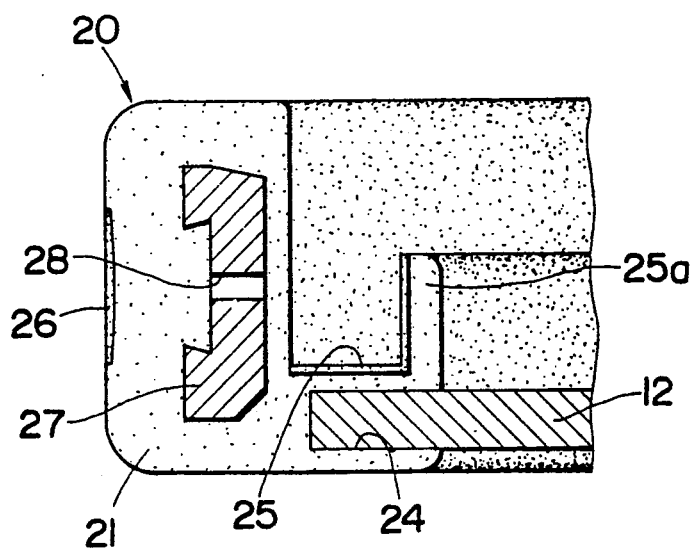

FIGS. 8 and 9 illustrate another embodiment of the present invention wherein flat fitting pins 27 are provided in the corner member 20 and a fitting recess 37 having a cross section corresponding to the fitting pins 27 is formed in the straight member 30. Further, an expanding slot 28 parallel to the inserting direction is formed in the flat fitting pin 27, and the recess 37 is made slightly smaller than the outer size of the fitting pin 27. Forming the fitting pin 27 flat can restrict the direction of assembling the straight members and the corner members 20 at the time of assembling the frame. Forming the expanding slot 28 in the fitting pin 27 and pressing the pin into the straight member 30 can further prevent their separation and can make the connected state of both members more secure; thereby, improving the rigidity of the frame.

According to the X-ray cassette of the present invention, as described above, the frame comprises corner members and straight members, which are connected by means of fitting projections and fitting pins of the corner members. The edge of the front plate is fitted in the front-plate receiving grooves formed in the inner walls of the corner members and straight members; thereby eliminating the need for bending the frame, and thus, preventing deformation, twisting or the like from occurring on the frame. Further, the corner members are produced by the integral formation and the straight members can be produced by simply cutting a long member; thereby, facilitating the manufacturing process. The structural arrangement of the metal frame being around the front plate can provide sufficient strength. The individual members can be assembled by simply fitting one to another without using screws; thereby, facilitating the assembling. It is therefore possible to provide an X-ray cassette which can reduce the manufacturing cost and has excellent strength, size accuracy and other significant advantages and benefits.

Further, putting the groove formed in the frame and the projection formed at the periphery of the back plate together can improve the light-tightness between the frame and the back plate.

In addition, forming the corner members of hard synthetic resin can facilitate the manufacturing and provide higher strength and shock resistance, and making the fitting pins of the corner member of metal can improve the assembling strength of the joined section with the straight member. Integrally buried in the corner member at the time the body and the fitting projections of the corner member are formed of hard synthetic resin, the metal fitting pins can be easily made integral with the corner member and sufficient side accuracy can be provided. Further, making the fitting pins flat can restrict the direction of assembling the straight members and the corner members at the time of assembling the frame, and forming the expanding slot in the fitting pin and pressing the pin into the straight member can prevent their separation.

The straight members, if made with an aluminum extruded member having a fitting recess formed therein, can be easily produced with higher size accuracy; thereby, providing sufficient strength.

In addition, forming an indicator-attaching recess on the outer wall of the body of the corner member, and coloring this recess for various display purposes or attaching an indicator thereto can prevent erroneous usage or the like and can prevent the indicators from peeling or coming off during usage.

We claim:

1. An x-ray cassette, comprising:
    a substantially rectangular front plate;
    a frame provided around said front plate; and
    a back plate hinged to said frame, wherein said frame includes corner members corresponding to corner portions of said front plate and straight members connected to said corner members and corresponding to side portions of said front plate,
    said corner members each having a substantially L-shaped body, fitting projections protruding from both ends of said body and fitting pins formed integral to said fitting projections,
    said straight members each having fitting recesses to receive said fitting projections and fitting pins of said corner member,
    said corner members and straight members having front-plate receiving grooves formed continuous in inner walls thereof for receiving edge portions of said front plate.

2. An x-ray cassette according to claim 1, wherein said corner members and said straight members include continuously formed grooves open on a back plate side, and a periphery of said back plate includes a projection to be fitted in said grooves of said corner members and said straight members.

3. An x-ray cassette according to claim 1, wherein said corner members are said body and fitting projections formed integral with hard synthetic resin and said fitting pins made of metal.

4. An x-ray cassette according to claim 3, wherein said metal fitting pins have one end buried in said body of said hard synthetic resin to be integral therewith.

5. An x-ray cassette according to claim 1, wherein said straight members are formed of an aluminum extruded member and have a fitting recess formed over the entire length to receive said fitting projections and fitting pins of said corner members.

6. An x-ray cassette according to claim 1, wherein said corner members have an indicator-attaching recess formed in an outer wall of said body.

7. An x-ray cassette according to claim 1, wherein said fitting pins have a circular cross-section.

8. An x-ray cassette according to claim 1, wherein said fitting pins have a polygonal cross-section.

* * * * *